United States Patent [19]

McCullough

[11] 4,226,465
[45] Oct. 7, 1980

[54] LOAD SUPPORTING FRAME ASSEMBLY

[76] Inventor: William L. McCullough, 2099 Helena Rd., Winterhaven, Fla. 33880

[21] Appl. No.: 962,065

[22] Filed: Nov. 20, 1978

[51] Int. Cl.³ .............................................. B62D 21/02
[52] U.S. Cl. ..................................... 296/182; 52/721; 105/414; 296/43; 296/204
[58] Field of Search ............... 296/182, 203, 204, 205, 296/181, 187, 29, 30, 43; 105/413, 414, 422; 410/101, 104, 105; 52/79.1, 721, 778

[56] References Cited

U.S. PATENT DOCUMENTS

| | | | |
|---|---|---|---|
| 2,735,377 | 2/1956 | Elsner | 410/105 |
| 3,126,224 | 3/1964 | Carter, Jr. et al. | 296/181 |
| 3,252,730 | 5/1966 | Chieger et al. | 296/181 |
| 3,266,837 | 8/1966 | Stricker, Jr. et al. | 296/181 |
| 3,422,508 | 1/1969 | Higuchi | 410/105 |
| 3,705,732 | 12/1972 | Marinelli | 296/182 |
| 3,909,059 | 9/1975 | Benninger et al. | 105/422 |
| 3,989,399 | 11/1976 | Slowbe | 52/721 |
| 4,020,769 | 5/1977 | Keir | 410/104 |

Primary Examiner—John J. Love
Assistant Examiner—Ross Weaver

[57] ABSTRACT

A load supporting frame particularly suited for use as a road trailer is disclosed. The frame comprises a pair of longitudinally extending transversely spaced main beams, a plurality of central transverse members extending between said main beams and a plurality of corresponding transverse outboard members outwardly extending from said main beams, and a longitudinally extending side rail secured to the extending ends of said transverse outboard members on each side of the frame. Each of the main beams has a generally I-shaped configuration and comprises a vertically disposed web having an upper edge and a lower edge and removable flanges formed by a pair of angle members along said upper and lower edges. A connector for detachably securing said transverse members defines with the detachable flanges a key and mating keyway whereby the angle members, connectors and transverse members are self-aligning with each other when assembled and secured together.

A novel tie-down anchor and a novel detachable sidewall post are also disclosed.

12 Claims, 16 Drawing Figures

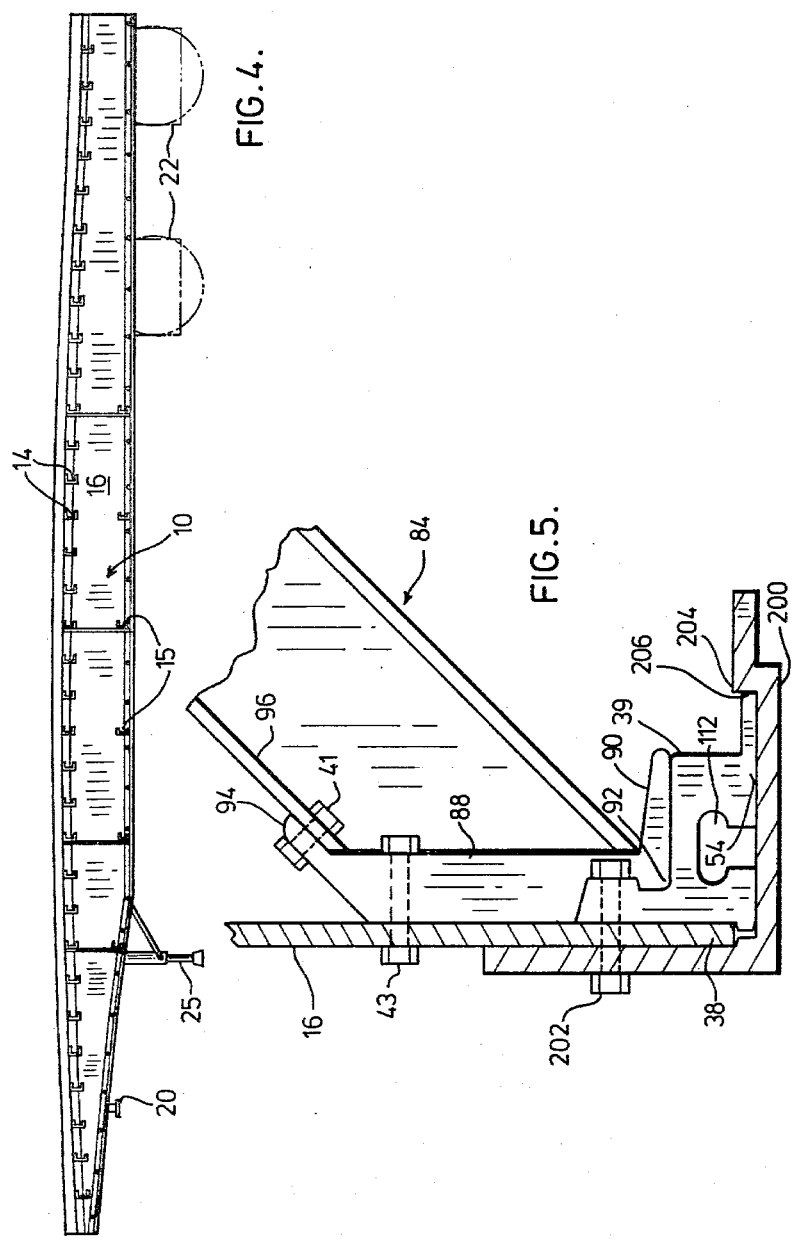

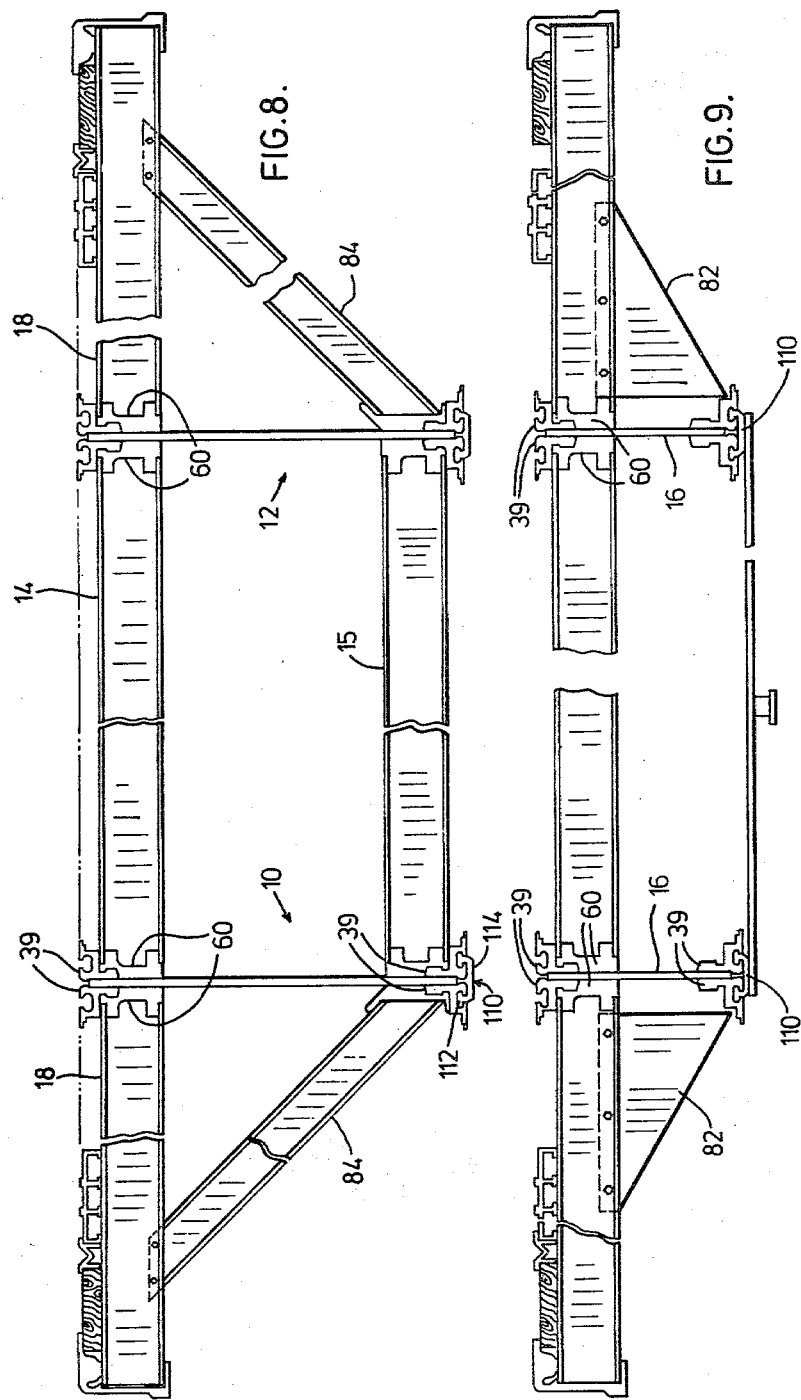

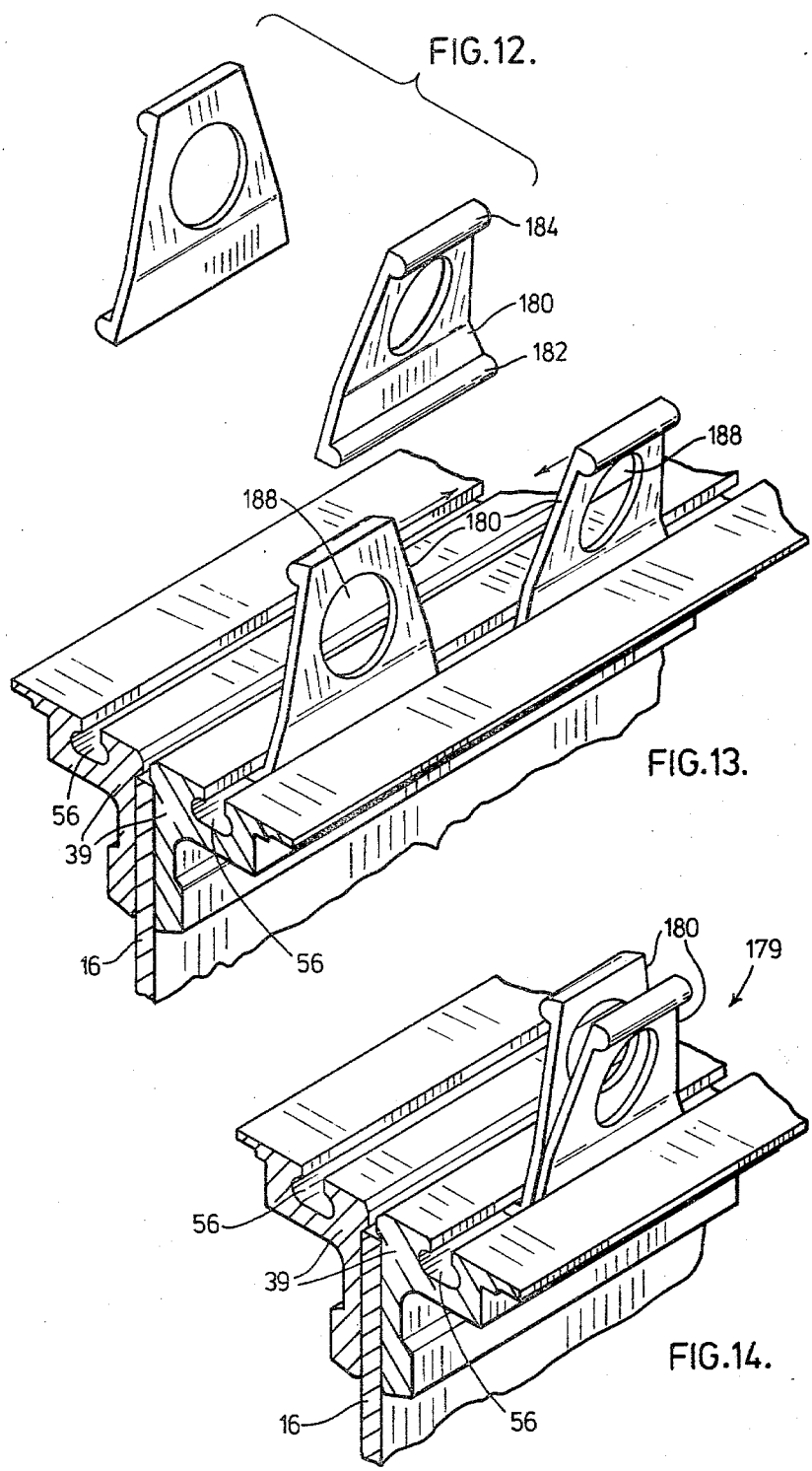

LOAD SUPPORTING FRAME ASSEMBLY

BACKGROUND OF THE INVENTION

This invention relates to load supporting frame assemblies and, in particular, relates to load supporting frame assemblies which have utility in flatbed road trailers, self propelled vehicles and bridge sections, of a bolted construction, which can be readily assembled and disassembled and modified for various load requirements.

Flatbed trailers for road use are generally manufactured of steel and comprise a pair of longitudinal I-beams with transverse beams passing through the longitudinal I-beams and welded together to form an integral structure. Conventional flatbed trailers are structurally massive to support heavy loads, thus reducing available payload capacity.

The assembly of an integral trailer structure by welding necessitates a relatively long assembly time and the employment of skilled workmen. Any damage to a trailer necessitates expensive repairs or scrapping of the trailer due to the difficulty and time required in removing damaged portions of the trailer and re-assembling the trailer to its operative condition.

U.S. Pat. No. 3,319,393 issued May 16, 1967 discloses a flatbed trailer construction intended to overcome some disadvantages inherent in conventional designs. For example, the trailer construction disclosed in this patents provides a flatbed structure which is sufficiently tight to prevent the loss of comminuted materials such as, for example, grain when the flatbed is provided with side walls or a hopper. However, the trailer configuration is limited to the use of longitudinally extending beams of fixed design with cross members passing through the said longitudinal members and secured thereto as by welding, thus necessitating costly fabrication techniques.

U.S. Pat. No. 3,909,059 issued Sept. 30, 1975 relates to a floor and frame construction of a load carrying vehicle preferably formed of extruded aluminum components. The main longitudinally extending beams are of a fixed cross-section precluding facile variation of beam depth according to strength requirements.

STATEMENT OF INVENTION

The load supporting frame assembly of the invention comprises, in general, the combination of a pair of longitudinally extending transversely spaced main beams, a plurality of central transverse members extending between said main beams in longitudinally spaced relationship along said main beams and a plurality of transverse outboard members outwardly extending from said main beams in longitudinally spaced relation along said main beams, said main beams having a generally I-shaped configuration and comprising a vertically disposed web having an upper edge and a lower edge, an upper flange formed by a pair of angle members each having a pair of flanges perpendicular to each other and secured back-to-back to the web at the web upper edge by one flange each whereby the other flanges fall in a common plane, said back-to-back flamges having a key formed thereon, and a lower flange formed by at least one angle member having a pair of flanges perpendicular to each other secured to the web at the web lower edge by one flange whereby the other flange is in a plane below said lower edge, said flange secured to the web having a key formed thereon, a connector for detachably securing said transverse central members and said transverse outboard members to said main beams comprising a planar base adapted to abut the beam web, said base having a recess and a keyway for receiving the flanges secured to the web and for receiving the flanges secured to the web and for receiving the keys formed thereon, whereby the angle members, connectors and transverse members are self-aligning with each other when secured together.

It is a principal object of the present invention to provide a flatbed trailer construction of substantially self-aligning components which can be assembled or disassembled by the use of connecting means such as nuts and bolts.

It is another important object of the present invention to provide a flatbed trailer construction that can be readily modified in cross-section to suit load-carrying requirements and which can be assembled by semi-skilled and relatively unskilled workmen.

It is a further object of the present invention to provide a flatbed trailer construction preferably assembled from extruded aluminum parts which are relatively light in weight, thus increasing the effective load-carrying capacity of the trailer, particularly compared to conventional trailers constructed of heavier metals such as steel.

A further object of the invention is the provision of a a tie-down anchor for use with the structure of the present invention.

BRIEF DESCRIPTION OF THE DRAWINGS

The foregoing and other objects of the invention will become apparent from the following detailed description taken in conjunction with the accompanying drawings, in which:

FIG. 4 is a longitudinal section taken along line 4—4 of FIG. 1 showing the trailer wheels by ghost lines;

FIG. 5 is a transverse section through the bottom portion of a longitudinal beam member, showing an embodiment of lower flange and portion of lateral brace, in elevation;

FIG. 8 is a transverse section taken along line 8—8 of FIG. 2;

FIG. 9 is a transverse section taken along line 9—9 of FIG. 2;

FIG. 12 is a perspective view showing a pair of spaced apart tie-down anchor plates for use with the deck of the trailer bed of the invention;

FIG. 13 is a perspective view showing the anchor plates of FIG. 12 assembled in a linearly displaced relationship in a trailer bed of the invention;

FIG. 14 is a perspective view of the said anchor plates positioned in a back-to-back relationship;

Like reference characters refer to like parts throughout the description of the drawings.

DESCRIPTION OF THE PREFERRED EMBODIMENTS

Figure 1:
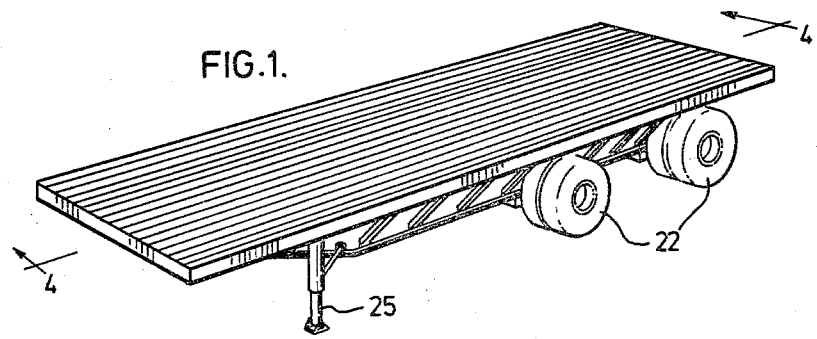
FIG. 1 is a perspective view of a flatbed trailer construction of the present invention.
Figure 2:
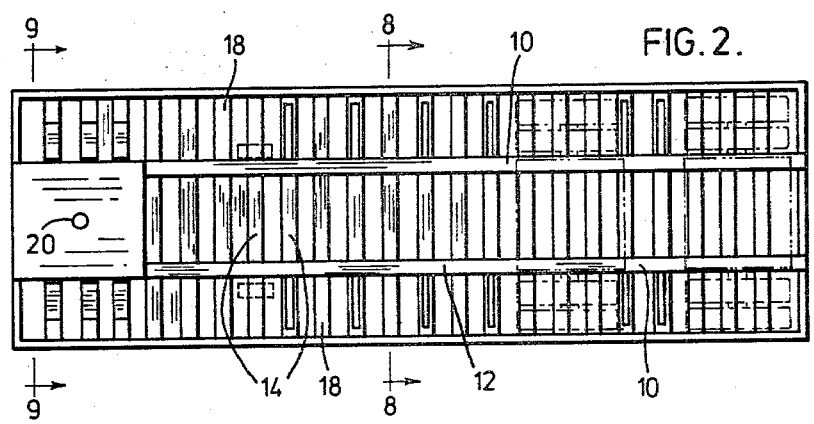
FIG. 2 is an underside view of the flatbed trailer construction illustrated in FIG. 1.

Referring now to FIGS. 1-4, the load supporting frame construction of my invention is exemplified by a flatbed trailer which generally comprises a pair of longitudinally extending, parallel, spaced apart main beams 10 interconnected by a plurality of central, transversely positioned upper cross-members 14 and lower cross-members 15 secured at each end to webs 16 of the main beams 10. A plurality of transverse outboard members 18 are secured to webs 16 at the opposite sides thereof preferably in alignment with central cross-members 14 as shown most clearly in FIG. 2.

The forward end of the trailer is supported by a king pin 20 and the rear end of the trailer end by at least a pair of tandem wheels 22 journalled in axle 24. The trailer assembly is shown in a parked position supported at its forward end by legs 25.

FIGS. 5 through 9 illustrate in detail embodiments of the structure of main beams 10 together with the interconnecting component parts. With particular reference to FIGS. 6 through 9, main beams 10 each comprises the web 16 having an upper flange 32 at the upper edge 34 of the web and a lower flange 36 at the web lower edge 38. Each of I-beam flanges 32, 36 comprises a pair of angle members 39 arranged in back-to-back relationship about the upper and lower edges 34, 38 of web 16 and secured together by removable connecting means such as nut and bolt assemblies 40. Each of angle members 39 comprises a flange 50 having a planar surface 49 adapted to abut a face of web 16, an upset portion or longitudinal rib 52 at the jucture of flanges 50,54 to seat against the upper edge 34 of web 16, and an upset portion or key 51 at the other end and on the opposite side of flange 50, to be described. The faces 58 of flanges 54 of back-to-back angle members 39 preferably fall into the same horizontal plane which is above the upper edge 34 of web 16, as shown, upon alignment of ribs 52 with edge 34. Flange 54 has an elongated inverted T-shaped recess 56 formed longitudinally therein for reasons which will become apparent as the description proceeds.

Transverse cross members 14 and outboard members 18 are secured to flanges 50 and to the web 16 by connectors 60 shown most clearly in FIGS. 6-9. Each of connectors 60 comprises a planar base 62 for abutment against web 16 having a recess 64 formed at one end with notch or keyway 66 for receiving key 51 of angle flange 50. A pair of spaced brackets 70,72 depending from opposite ends of base 62 have shoulders 71,73 formed on their respective outside surfaces. Flanges 50 of angle members 38 have oversize holes 53 formed therein for receiving bolts 40 passing through openings formed in brackets 70,72 whereby abutment of ribs 52 on upper web edge 34 and keying of connectors 60 onto flanges 50 align the components together for ease of assembly.

Figure 6:
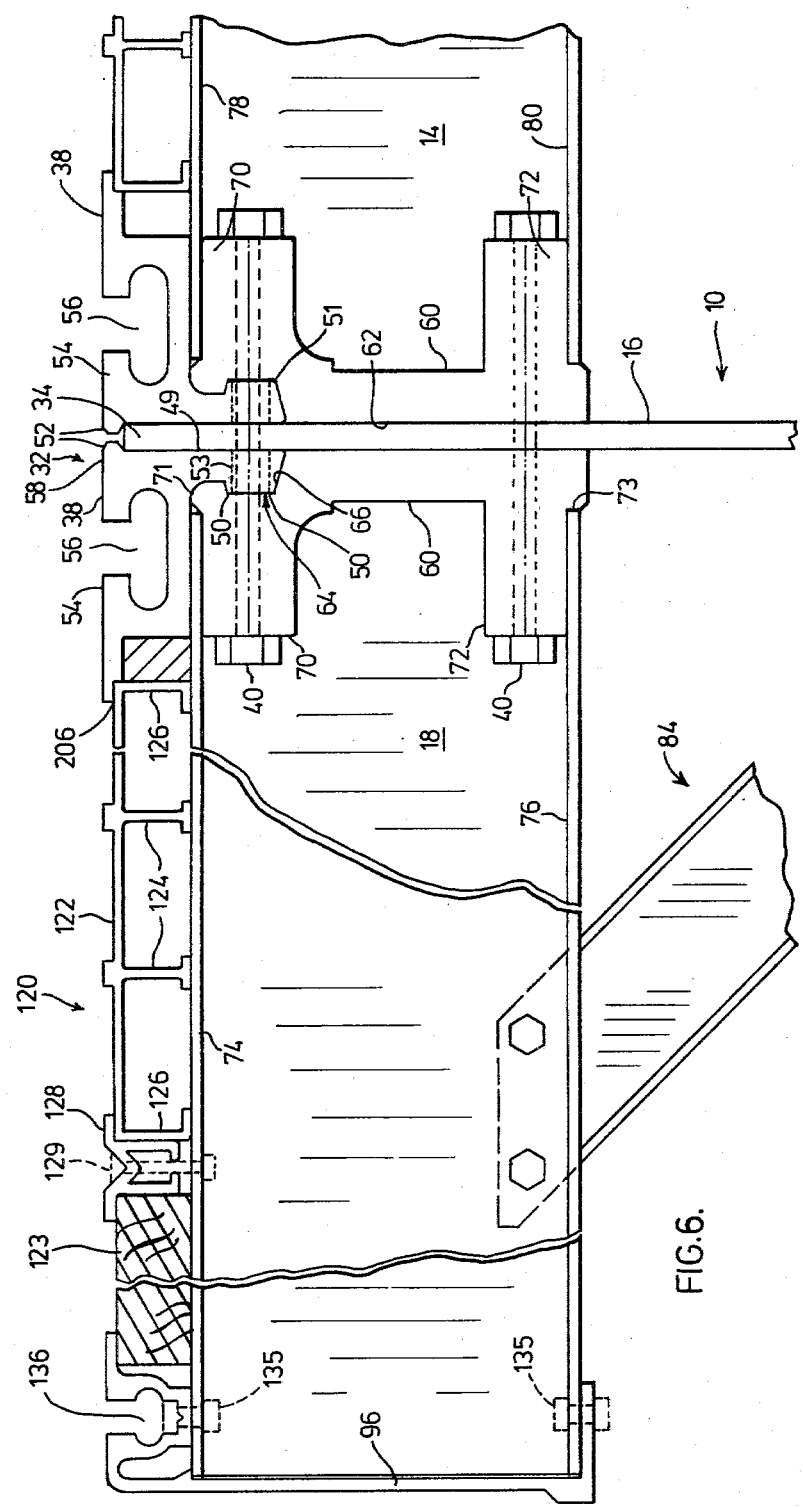
FIG. 6 is a transverse section, partly in elevation, through an upper portion of a longitudinal member showing the interconnection of transverse load carrying members together with floor members.
Figure 7:
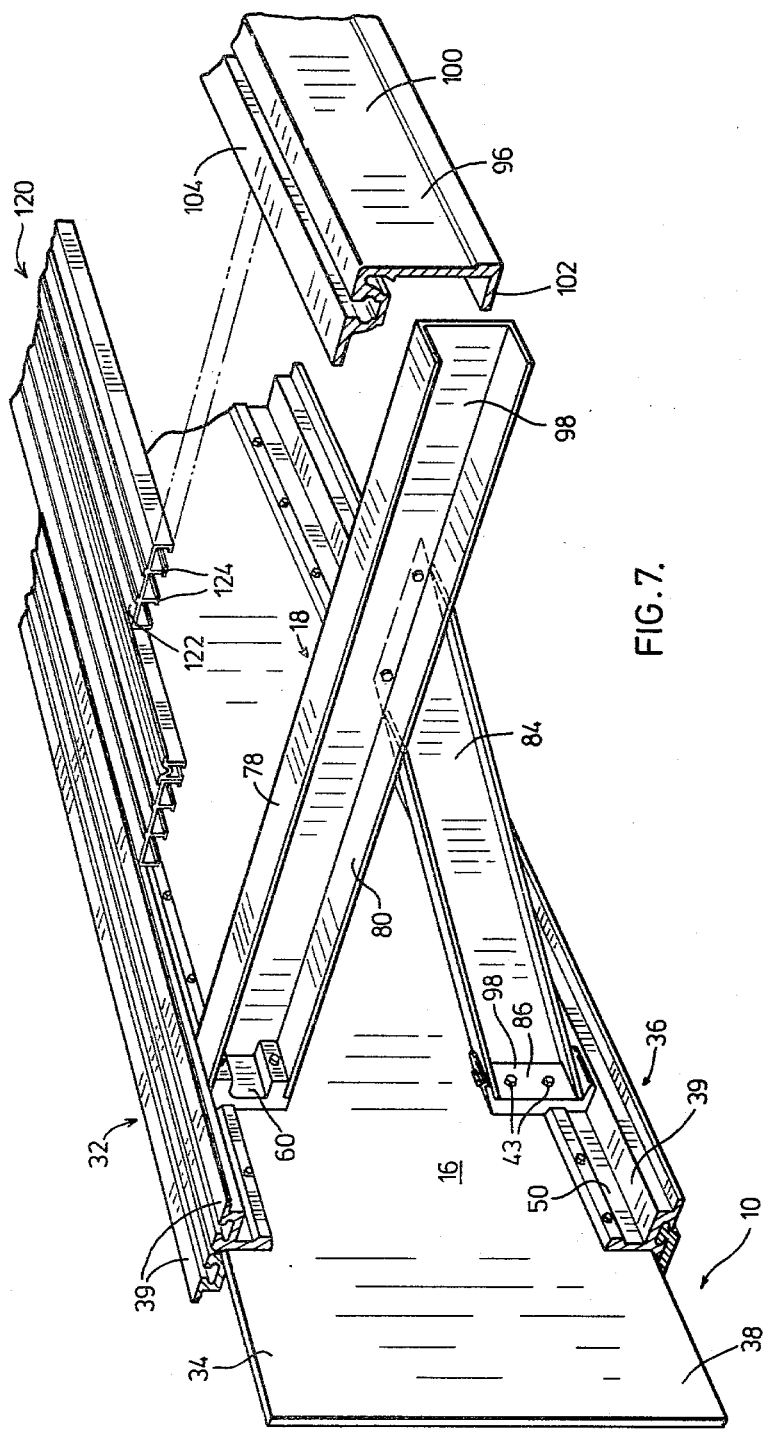
FIG. 7 is a perspective view, partly cut away, showing a longitudinal beam together with a lateral brace, another embodiment of lower flange and side rail.

The upper and lower surfaces of each of brackets 70,72 receive the upper and lower flanges 74,76 respectively of transverse channel cross members 14 and upper and lower flanges respectively of outboard channel members 18 as illustrated most clearly in FIGS. 6 and 7, with abutment against shoulders 71,73.

Figure 3:
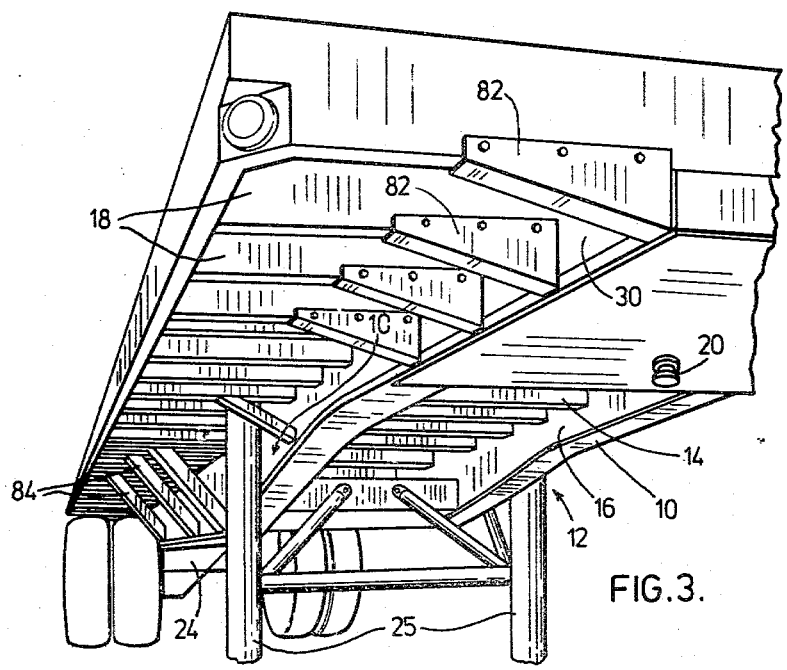
FIG. 3 is a perspective view taken from the front end of the flatbed trailer of the invention.

With reference now to FIGS. 3 and 9, it will be evident that outboard members 18 are braced by gussets 82 at the forward end of the flatbed trailer where the web 16 is of a reduced depth. The remainder of the length of the flatbed trailer has diagonal outrigger channel brace members 84 shown in more detail in FIGS. 7 and 8 which are secured at their lower ends by a connector 86 removably secured to the lower edge of web 16 at 38 and to the flange 50 of lower angle members 38 by nut and bolt assemblies 43. Connector 86 comprises a planar base portion 88 and, as shown most clearly in FIG. 5, a flange 90 adapted to seat in the bight 92 of angle member 38 and an oblique bracket 94 which is connected to flange 96 of channel member 84 by a nut and bolt assembly 41.

Side rails 96 are secured to the terminal ends 98 of outboard members 18 to provide rigid side edges to the trailer flatbed. Side rails 96 comprise a web 100 with a lower longitudinally extending inner flange 102 adapted to abut the exterior surface of lower flange 80 of outboard member 18 and a flange 104 extending from the opposite upper edge of rails 96 adapted to overlie upper flange 78 of the said outboard member 18.

With reference now to FIGS. 8 and 9, lower flanges 38 can be stiffened by means of a generally U-shaped closure plate 110 having T-shaped arms 112 depending from the web 114. Closure plate 110 can be added to the main beam flanges as desired to provide necessary rigidity and strength.

FIG. 5 illustrates another embodiment of my invention in which one angle member 39 is positioned against lower edge 38 of web 16 and a reverse angle member 200 secured on the opposite side of web 16 to angle member 39 by securing means 202. Member 200 has an interior shoulder 204 for abutment against the edge 206 of flange 54.

FIGS. 6 and 7 further illustrate decking 120 comprising longitudinal panel members 122 having depending internal ribs 124 and external ribs 126 adapted to seat on upper flanges 74 of outboard members 18 and upper flanges 78 of interior cross-members 14. The panel members 122 are secured to the crossmembers 14 and outboard members 18 by means of tie-down members 128 and headed securing means 129 extending through flanges 78,74. Decking 120 preferably comprises metal panel members 122 and wooden planks 123.

Side rails 96 are secured to outboard members 18 by nut and bolt securing assemblies 135 as shown in FIG. 6 seated in inverted longitudinal T-shaped recess 136.

Figure 10:
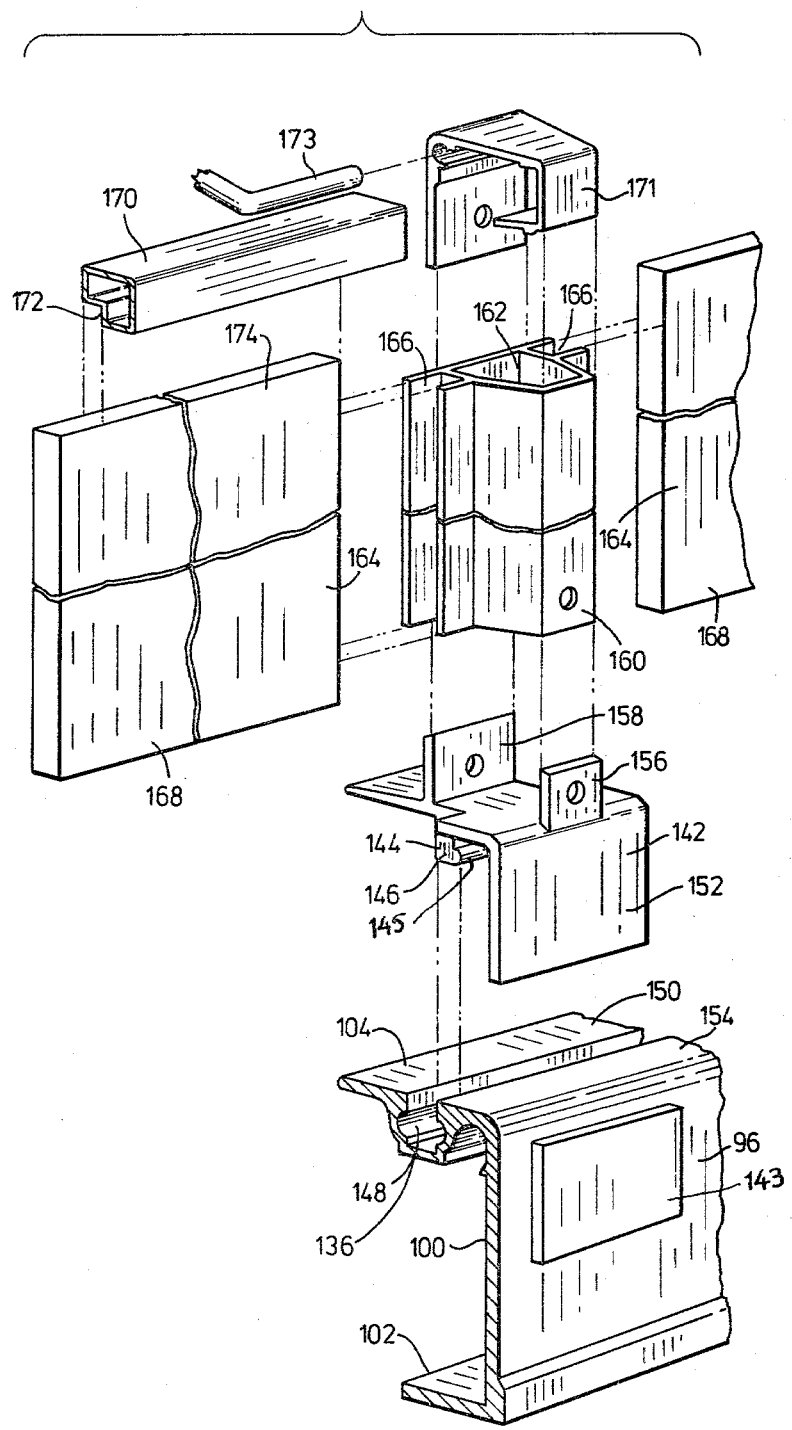
FIG. 10 illustrates an exploded perspective view of a side post assemblage for use with the trailer bed of the present invention.
Figure 11:
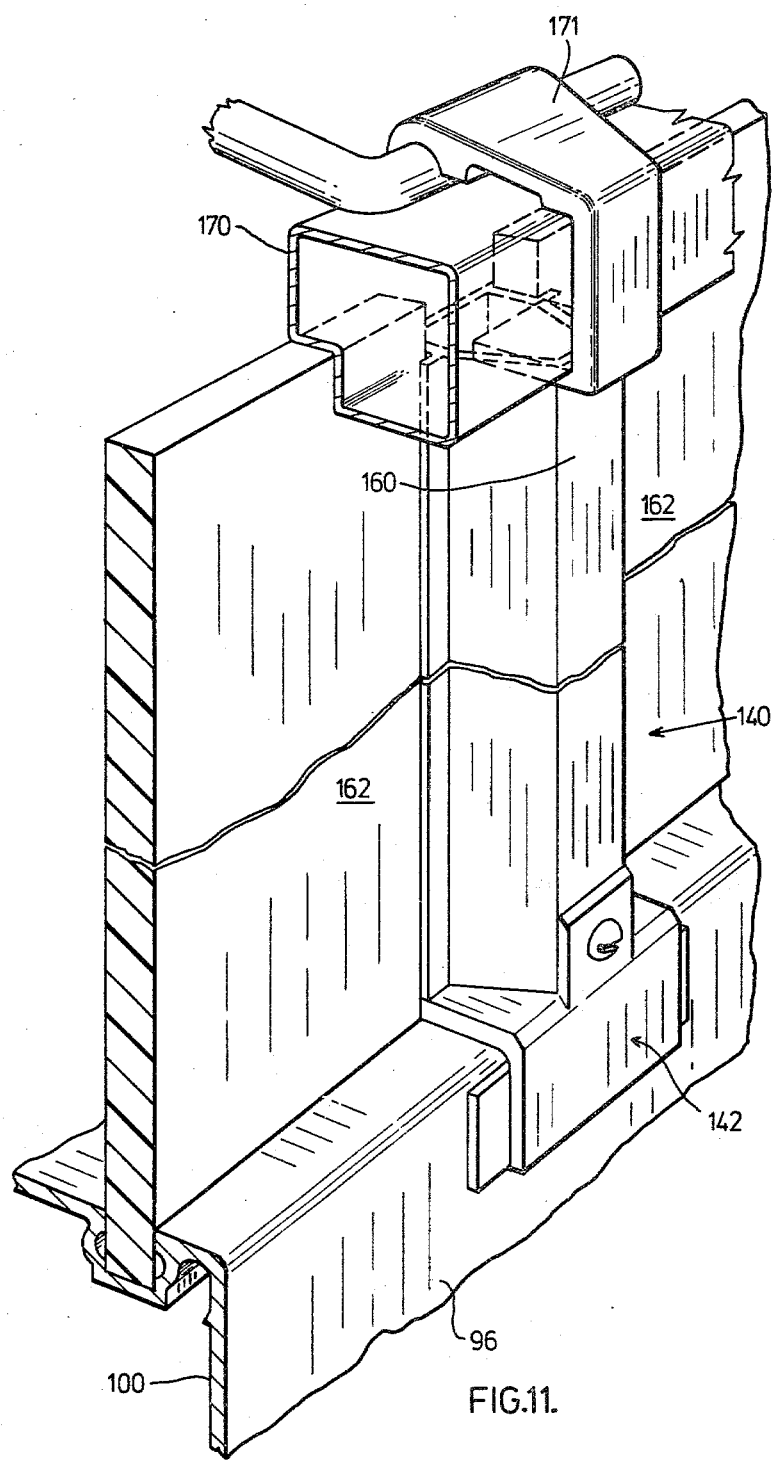
FIG. 11 is a perspective view of the assemblage shown in FIG. 10 illustrating interconnection of component parts.

With reference now to FIGS. 10 and 11, the structure of my invention includes a post assembly 140 removably secured to side rails 96 by interconnection of connector 142 having perpendicular arms with the said side rail 96. Connector 142 is secured onto rail 96 by inserting downwardly depending rib 144 into inverted T-shaped recess 136 formed in the top surface 150 of upper flange 104 and sliding connector 142 longitudinally onto rail upset 143 whereby rail 96 is tightly gripped between rib terminal flange 145 within recess 136 and connector flange 152. Upwardly extending spaced apart flanges 156,158 of connector 142 are adapted to receive post member 160; flange 158 being inserted within cavity 162 of post 160.

Wall members 162 are adapted to be gripped by post 160 by insertion of the vertical wall edges 164 into vertical recesses 166 defined in the sides of posts 160. The lower edge 168 of each of wall members 164 fits into longitudinal recess 136 formed in the top side of side rail 96. A tubular top rail 170 having a longitudinal recess 172 formed in one corner thereof and inserted in post cap 171 is locked in place by hoop 173 to provide rigidity to the top edges 174 of wall panels 164.

The components of post assembly 140 and wall members 162 are removably secured together by nut and bolt assemblies such as, for example, headed bolt 143 shown in FIG. 11.

Figure 15:
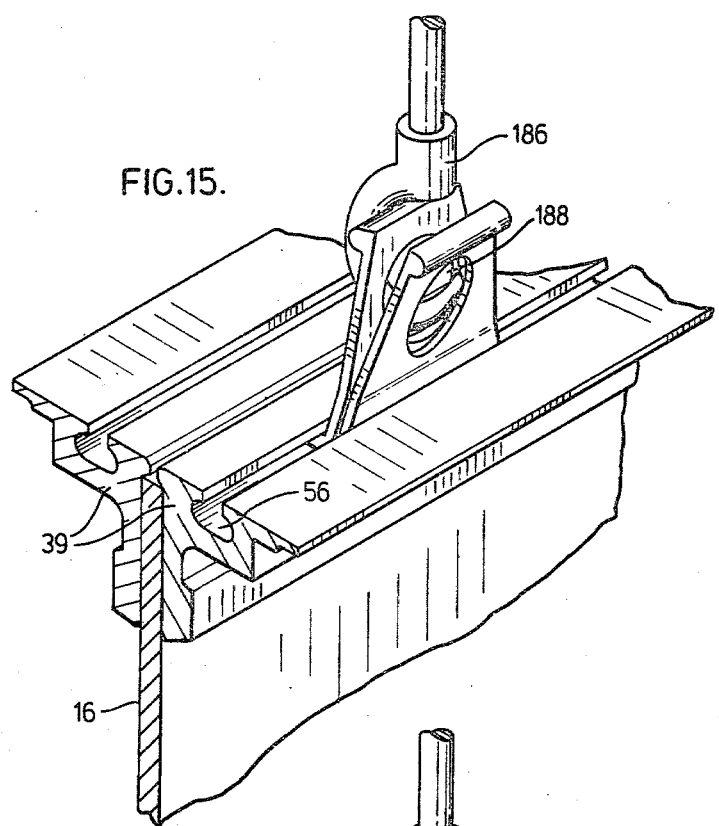
FIG. 15 is a perspective view showing a hook inserted in apertures formed in the anchor plates.
Figure 16:
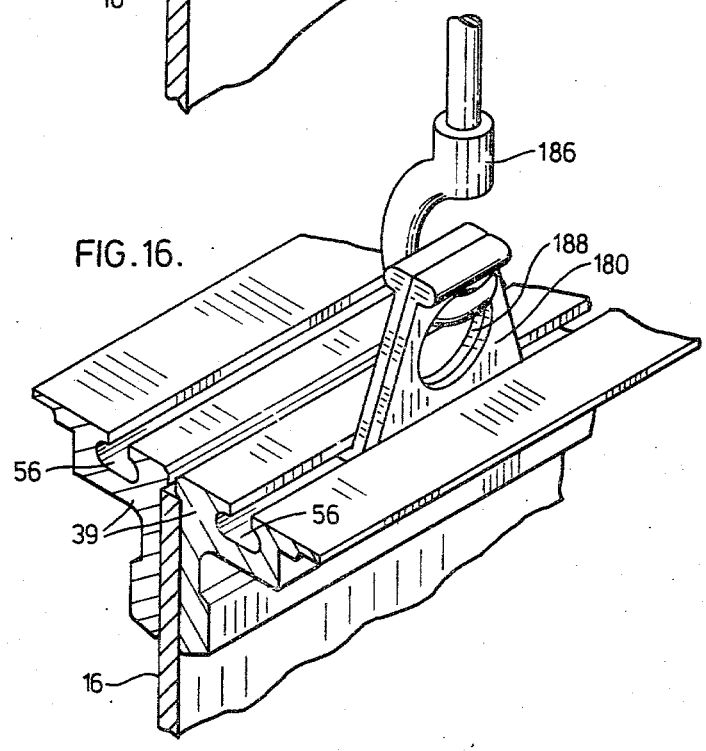
FIG. 16 is a perspective view of the hook of FIG. 15 under tension drawing the upper portions of the anchor plates together.

Turning now to FIGS. 12 through 16, tie-down anchors 179 comprise a plurality of plates 180 having a rib 182 formed at the bottom edge thereof and preferably a rib 184 formed at the top edge thereof. A pair of anchor plates 180 are inserted into an inverted T-shaped recess 56 formed in the upper flanges 54 of angle members 39, FIG. 13, or recess 136 of side rail 96, and the anchor plates slid into a back-to-back position as shown in FIG. 14. Lower ribs 182 are sufficiently narrow to permit insertion of said ribs into inverted T-shaped recesses 56 but too wide to prevent withdrawal of anchor plates 180 when said anchor plates are arranged in a back-to-back relationship. As shown in FIGS. 15 and 16, the imposition of a load on the upper end of anchor plates 180 by, for example, the insertion of a hook 186 into apertures 188 draws the upper ends of said plates together effectively biasing the lower edges having ribs 182 away from each other by pivotal movement into frictional engagement with the walls of recesses 56 and 136.

Component parts of my flatbed trailer preferably are formed of aluminum or aluminum alloys by extrusion. Thus, the parts can be formed quickly and relatively inexpensively and readily cut to desired lengths. The depth of main beams 10 can be controlled by shaping web 16 as desired and bending angle members 39 for abutment with the edges of the said web. The trailer assembly can be fabricated by the assembly of nuts and bolts in about 70% of the time normally required to weld comparable steel trailers.

In addition, I have found that the structure of the present invention has greater rigidity than steel trailers of comparable weight and can be assembled by semi-skilled and unskilled workmen using, for example, colour coded nuts and bolts. Component parts can be shipped in a knock-down form and assembled on site without the need for special tools.

Although the description has proceeded with reference to flatbed trailer constructions, it will be understood that self-propelled vehicles and bridge sections can be fabricated from the components of the present invention.

What I claim as new and desire to protect by Letters Patent of the United States is:

1. A load supporting frame assembly comprising, in combination, a pair of longitudinally extending transversely spaced main beams, a plurality of central transverse members extending between said main beams in longitudinally spaced relationship along said main beams and a plurality of transverse outboard members outwardly extending from said main beams in longitudinally spaced relation along said main beams, a longitudinally extending side rail secured to the extending ends of said transverse outboard members, said main beams having a generally I-shaped configuration and comprising a vertically disposed web having an upper edge and a lower edge, an upper flange formed by a pair of angle members each having a pair of flanges perpendicular to each other and secured back-to-back to the web at the web upper edge by one flange each whereby the other flanges fall in a common plane, and a lower flange formed by at least one angle member having a pair of flanges perpendicular to each other secured to the web at the web lower edge by one flange whereby the other flange is in a plane in proximity to said lower edge, a connector for detachably securing said transverse central members and said transverse outboard members to said main beams comprising a planar base adapted to abut the beam web, and one of said angle member flanges or said connector planar bases having a key formed thereon and the other having a mating keyway formed therein whereby the angle members, connectors and transverse members are self-aligning with each other when assembled and secured together.

2. A load supporting frame as claimed in claim 1 in which said lower main beam flanges each comprises a pair of angle members each having a pair of flanges perpendicular to each other and secured back-to-back to the web at the web lower edge by one flange each whereby the other flanges fall in a common plane.

3. A load supporting frame assembly as claimed in claim 2 in which said angle member back-to-back flanges each has a longitudinal key formed thereon and said connector planar bases each has a mating keyway formed therein for self-aligning of the angle members, connectors and transverse members with each other.

4. A load supporting frame as claimed in claim 3 in which each of said central and outboard transverse members has a channel cross-section with spaced flanges depending from a web and each of said connectors comprises a planar base having a pair of spaced brackets with shoulders formed thereon adapted to receive and engage the channel flanges whereby said channel flanges abut said bracket shoulders.

5. A load supporting frame as claimed in claim 4 in which said connector brackets, angle flange keys and main beam webs have holes formed therein for alignment upon assembly thereof with headed bolts for securing the connectors, angle members and webs together.

6. A load supporting frame as claimed in claim 4 in which said load supporting frame has at least a pair of tandem wheels journalled in an axle secured to one end thereof and a king pin secured to the other end thereof for trailing said frame.

7. A load supporting frame as claimed in claim 6 additionally comprising a plurality of outrigger channel brace members extending diagonally between the side rails and the web lower edge, and a connector for detachably securing each of said brace members to the web, said connector comprising a planar base and a pair of spaced brackets for receiving said brace member therebetween.

8. A load supporting frame as claimed in claim 7 in which the angle member flanges in a common plane forming the main beam upper and lower flanges each has an elongated inverted T-shaped recess formed therein.

9. A load supporting frame as claimed in claim 8 additionally comprising a tie-down anchor for detachable securement to said inverted T-shaped recesses, said tie-down anchor comprising a pair of anchor plates each having a rib formed at one end having a width sufficiently narrow to permit insertion of said ribs into the recesses but too wide to prevent withdrawal of the anchor plates when said anchor plates are arranged in a back-to-back relationship with said ribs facing outwardly and seated in the enlarged portion of the recesses, means formed at the other end of each anchor plate for attachment to load securing means, and each of said anchor plates having an outward bend formed therein whereby abutment of the ends of the plates having the load securing means biases the ribs outwardly by pivotal movement into frictional engagement with the walls of the recess.

10. A load supporting frame as claimed in claim 8 additionally comprising an inverted T-shaped recess formed in an upper surface of each of the side rails.

11. A load supporting frame as claimed in claim 10 additionally comprising a post assembly for securement to said side rail, said post assembly including a connector having a pair of arms bent perpendicular to each other, one of said arms having a rib projecting therefrom on its included side, said rib having a terminal flange facing the other arm adapted to seat in said rail recess, and said rail having an upset formed on its side wall, whereby said connector projecting rib on one arm and the other arm rigidly grip the rail therebetween.

12. A load supporting frame as claimd in claim 8 in which the main beam web and flanges and transverse members are formed of extruded aluminum.

* * * * *